US011264020B2

(12) United States Patent
Pourmohammad et al.

(10) Patent No.: US 11,264,020 B2
(45) Date of Patent: Mar. 1, 2022

(54) SYSTEMS AND METHODS FOR CONVERSATIONAL INTERACTION WITH A BUILDING AUTOMATION SYSTEM

(71) Applicant: Johnson Controls Tyco IP Holdings LLP, Milwaukee, WI (US)

(72) Inventors: Sajjad Pourmohammad, Milwaukee, WI (US); Joseph M. Mueller, Hales Corners, WI (US); Youngchoon Park, Brookfield, WI (US); Sudhi R. Sinha, Milwaukee, WI (US); Daniel Mellenthin, Milwaukee, WI (US); Gerald A. Asp, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 114 days.

(21) Appl. No.: 16/028,126

(22) Filed: Jul. 5, 2018

(65) Prior Publication Data
US 2019/0013023 A1   Jan. 10, 2019

Related U.S. Application Data

(60) Provisional application No. 62/528,909, filed on Jul. 5, 2017.

(51) Int. Cl.
*G10L 15/22* (2006.01)
*H04L 12/28* (2006.01)
(Continued)

(52) U.S. Cl.
CPC ............. *G10L 15/22* (2013.01); *G06F 3/167* (2013.01); *G10L 15/1815* (2013.01);
(Continued)

(58) Field of Classification Search
CPC ... G10L 15/22; G10L 2015/223; G10L 15/30; G10L 2015/228; G10L 15/183;
(Continued)

(56) References Cited

U.S. PATENT DOCUMENTS

| 10,748,529 B1 | 8/2020 | Milden |
| 2007/0050191 A1 * | 3/2007 | Weider .................... G10L 21/06 |
| | | 704/275 |

(Continued)

FOREIGN PATENT DOCUMENTS

| DE | 10 2013 101 331 | 8/2013 |
| WO | WO 2013/177213 | 11/2013 |
| WO | WO-2016/209489 A1 | 12/2016 |

OTHER PUBLICATIONS

Jovo, The Framework for Voice App Development, https://www.jovo.tech/#, retrieved Dec. 28, 2018, 9 pages.
Sateli et al., Smarter Mobile Apps through Integrated Natural Language Processing Services, 2013, 15 pages.
(Continued)

*Primary Examiner* — Huyen X Vo
(74) *Attorney, Agent, or Firm* — Foley & Lardner LLP

(57) ABSTRACT

A system for user interaction with a building automation system (BAS). The system includes a user device configured to accept vocal inputs and produce audio outputs, and a server in communication with the user device and a BAS controller. The server is configured to translate a vocal input to input text, and determine and store a conversation context based on the input text. The server is further configured to determine a desired output corresponding to the input text. Additionally, the server is configured to receive, from the BAS controller, BAS data corresponding to the desired output, and generate at least one audio output from the BAS data. The user device outputs the at least one audio output, and the server is configured to apply the conversation context to a subsequent vocal input.

17 Claims, 14 Drawing Sheets

(51) Int. Cl.
*G10L 15/30* (2013.01)
*G10L 15/18* (2013.01)
*G06F 3/16* (2006.01)
*G06F 3/0482* (2013.01)
*G06F 21/31* (2013.01)
*G06F 3/0484* (2022.01)

(52) U.S. Cl.
CPC .......... *G10L 15/30* (2013.01); *H04L 12/2803* (2013.01); *G06F 3/0482* (2013.01); *G06F 3/0484* (2013.01); *G06F 21/31* (2013.01); *G06F 2221/2141* (2013.01); *G10L 2015/223* (2013.01)

(58) Field of Classification Search
CPC ......... G10L 15/32; G10L 15/26; G10L 17/00; G10L 15/00; G10L 15/063; G10L 15/265; G10L 25/48; G10L 13/00; G10L 15/065; G10L 21/00; G10L 15/1815; G10L 15/18; G06F 3/167; G06F 3/16; G06F 3/0482; G06F 21/31; G06F 3/0484; G06F 2221/2141; H04L 12/2803; H04L 12/28
See application file for complete search history.

(56) References Cited

U.S. PATENT DOCUMENTS

| | | | |
|---|---|---|---|
| 2015/0053781 | A1 | 2/2015 | Nelson et al. |
| 2015/0204561 | A1 | 7/2015 | Sadwick et al. |
| 2015/0276254 | A1 | 10/2015 | Nemcek et al. |
| 2016/0295397 | A1* | 10/2016 | Nielsen ................ H04W 76/10 |
| 2016/0327921 | A1 | 11/2016 | Ribbich et al. |
| 2016/0378080 | A1* | 12/2016 | Uppala ................ G05B 15/02 |
| | | | 700/275 |
| 2017/0199934 | A1* | 7/2017 | Nongpiur ............... G06F 3/165 |
| 2017/0214541 | A1* | 7/2017 | Brun ........................ G06F 8/34 |
| 2017/0358317 | A1* | 12/2017 | James .................. H04W 12/06 |
| 2018/0165061 | A1 | 6/2018 | Nicolich-Henkin et al. |
| 2018/0331843 | A1* | 11/2018 | Bag ...................... H04L 12/4625 |
| 2019/0138704 | A1 | 5/2019 | Shrivastava et al. |

OTHER PUBLICATIONS

Smartly.AI, Introducing Our New Platform for Google Home & Amazon Alexa Voice Applications, https://www.smartly.ai/blog/voice-application-platform/, retrieved Dec. 28, 2018, 6 pages.

Search Report for International Application No. PCT/US2018/040926, dated Oct. 5, 2018, 13 Pages.

European Office Action on EP Appl. No. 18752325.3 dated Dec. 7, 2021 (7 pages).

* cited by examiner

SYSTEMS AND METHODS FOR CONVERSATIONAL INTERACTION WITH A BUILDING AUTOMATION SYSTEM

CROSS-REFERENCE TO RELATED APPLICATIONS

This application claims the benefit of and priority to U.S. Provisional Patent Application No. 62/528,909 filed Jul. 5, 2017, the entirety of which is incorporated by reference herein.

BACKGROUND

The present disclosure relates generally to building automation systems, and more particularly to user interactions with a building automation system (BAS).

A building automation system (BAS) is, in general, a system of devices configured to control, monitor, and manage equipment in or around a building or building area. A BAS can include a heating, ventilation, and air conditioning (HVAC) system, a security system, a lighting system, a fire alerting system, another system that is capable of managing building functions or devices, or any combination thereof. BAS devices can be installed in any environment (e.g., an indoor area or an outdoor area) and the environment can include any number of buildings, spaces, zones, rooms, or areas. A BAS can include a variety of devices (e.g., HVAC devices, controllers, chillers, fans, sensors, music, lighting, etc.) configured to facilitate monitoring and controlling the building space.

The status of equipment and/or devices within a BAS is typically controlled and monitored by field controllers within the BAS. The field controllers push the corresponding data to a server (or servers) that run monitoring and control software. Collected data can be stored in a server database. The data can include sensor readings or metrics associated with the readings, events that are generated by the equipment (e.g., alarms, warnings, etc.). The BAS software can generally collect the data and display it to a user (e.g., trained operator) through a user interface.

SUMMARY OF THE INVENTION

One implementation of the present disclosure is a system for user interaction with a building automation system (BAS). The system includes a user device configured to accept vocal inputs and produce audio outputs, and a server in communication with the user device and a BAS controller. The server is configured to translate a vocal input to input text, and determine and store a conversation context based on the input text. The server is further configured to determine a desired output corresponding to the input text. Additionally, the server is configured to receive, from the BAS controller, BAS data corresponding to the desired output, and generate at least one audio output from the BAS data. The user device outputs the at least one audio output, and the server is configured to apply the conversation context to a subsequent vocal input.

In some embodiments, the system further includes updating a BAS parameter based on the desired output. Additionally, in some embodiments, the vocal input corresponds to a request to add a new user, and updating the BAS parameter includes adding the new user to a BAS database and providing corresponding access rights.

In some embodiments, the BAS data corresponds to a detected equipment fault, the server further configured to submit a maintenance request and alert a user via the at least one audio output. In some embodiments, the maintenance request includes at least an equipment name, a location, and fault data. Further, in some embodiments, the maintenance request includes an order and payment for a replacement part.

In some embodiments, the BAS data corresponds to a detected equipment fault, the server further configured to determine a plurality of potential fault causes. Addiitonally, the server is configured to calculate a probability for each potential fault cause, and determine the potential fault with a highest probability. In some embodiments, the at least one audio output corresponds to the potential fault with the highest probability.

Another implementation of the present disclosure is a method of user interaction with a building automation system (BAS). The method includes determining a first user input, and determining a conversation context based on the first user input. The method further includes receiving BAS data from a BAS controller, the BAS data corresponding to the first user input. Additionally, the method includes providing, to a user, a first output corresponding to the BAS data, and determining a second user input. The method further includes forming a second output based on the second user input and the conversation context, and providing, to the user, the second output.

In some embodiments, the method includes determining a user ID, and customizing each of the first output and the second output, based on the user ID. Further, in some embodiments, the method further includes determining access rights corresponding to the user ID, and updating a BAS parameter based on at least one of the first user input and the second user input, the access rights including updating the BAS parameter.

In some embodiments, the method includes accessing a BAS database to determine the BAS data, comparing the second output to the first output to determine a preferred output corresponding to the first user input, and updating the BAS database with the preferred output.

In some embodiments, providing the first output and the second output includes displaying the first output and the second output via a user interface. Further, the method includes displaying a list of selectable options corresponding to the first output, detecting a user selection corresponding to the second user input, and reprioritizing the list of selectable options for subsequent inputs, based on the user selection.

In some embodiments, the conversation context includes intent and entity parameters corresponding to the first user input. In some embodiments, the method further includes resetting the conversation context when a new user provides an input. In some embodiments, the method further includes resetting the conversation context after a threshold amount of time without subsequent user inputs.

Another implementation of the present disclosure is a user device for communicating with a building automation system (BAS). The user device includes a proximity sensor configured to determine a user location with respect to the user device. The user device further includes a microphone configured to accept vocal inputs from a user, a speaker configured to produce audio outputs to the user, and a processor in communication with the proximity sensor, the microphone, and the speaker. The processor is configured to receive user location data from the proximity sensor, and receive a vocal input from the microphone. The processor is further configured to store, in a memory, context parameters corresponding to the vocal input and the user location data.

The processor is further configured to determine a desired output corresponding to the vocal input, update an operating parameter within the BAS based on the desired output, and provide an audio output to the speaker, the audio output based on the desired output. Further, the processor analyzes a subsequent vocal input using the context parameters, prior to providing a subsequent audio output.

In some embodiments, the operating parameter corresponds to BAS equipment associated with the user location.

In some embodiments, the processor is further configured to determine a user ID from the vocal input, determine access rights corresponding to the user ID, and verify that the access rights comprise updating the operating parameter.

In some embodiments, the vocal input corresponds to a request to add a new user, and updating the operating parameter includes adding the new user to a BAS database and providing corresponding access rights.

DETAILED DESCRIPTION

Overview

Figure 1:
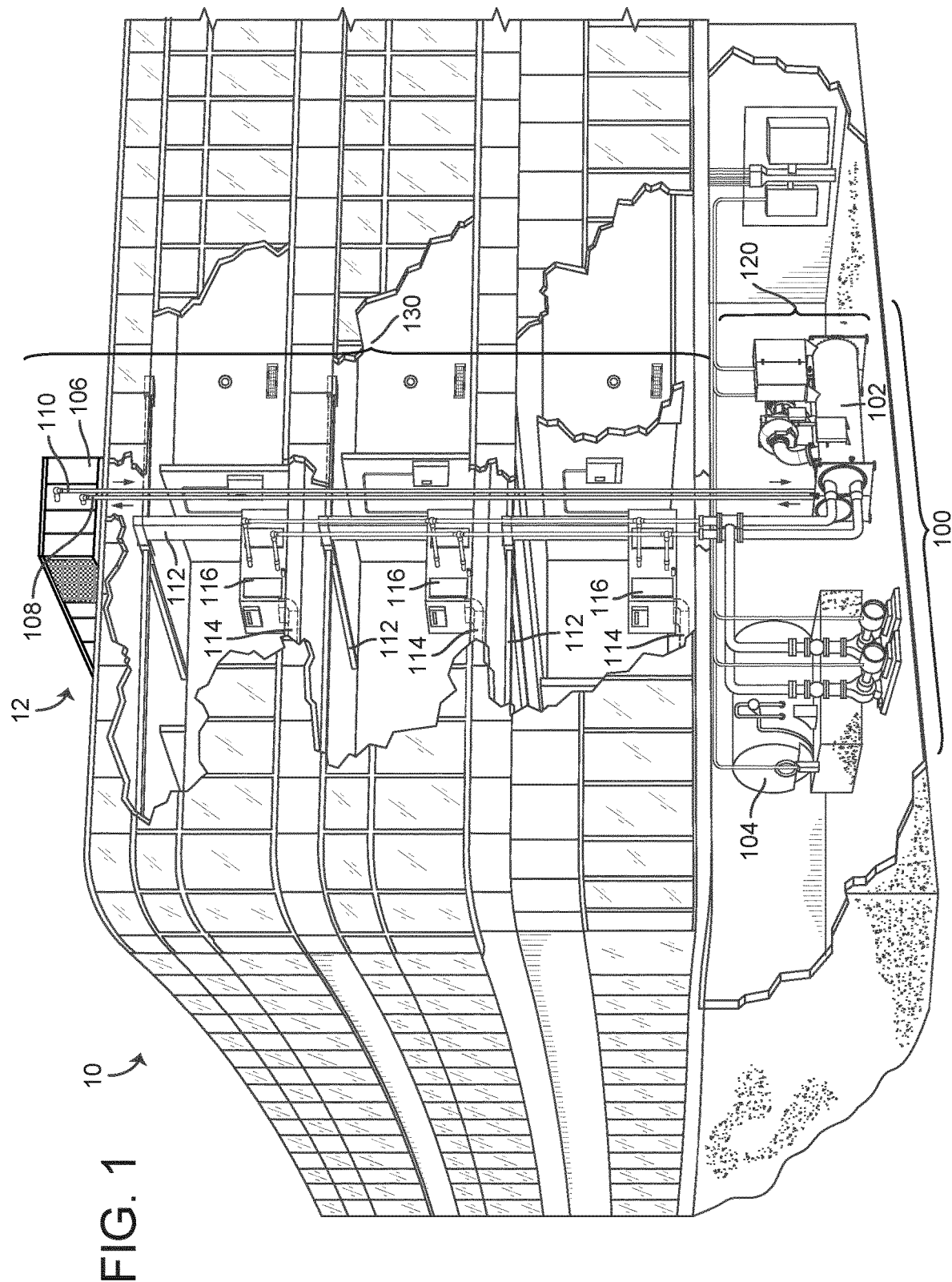
FIG. 1 is a drawing of a building equipped with a HVAC system, according to some embodiments.

As described above, field controllers within a building automations system (BAS) can push corresponding data to a server (or servers) that run monitoring and control software. Further, the collected data can be stored in a server database. A variety of users can interact with a BAS, oftentimes having varying degrees of access rights and/or expertise. Typically, a new user must be trained on the BAS software, and retraining can occur when software updates are released. Determining what keywords and navigations will provide the user with the applicable data can be time consuming, especially for new users (e.g., service technicians, contractors).

Modern sites can include multiple large buildings which include thousands of devices and sensors connected to a network. With the amount of data generated by the devices and sensors, monitoring and controlling based on the data can quickly become a challenge. There are usually intense training practices for the operators and administrators of such systems. Even highly trained operators have a hard time finding the data they are looking for since they have to go through multiple pages and menus, as well as filter the data to get to the desired data. This not only becomes a tedious task for the operators, they usually become frustrated because they have to repeat the same practice of opening up different menus, pages, filtering, formatting and then locating the desired data. This process quickly becomes frustrating since the same procedure needs to be repeated every time. Traditional systems do not learn or adopt to user behavior in the system.

The present disclosure includes systems, methods, and devices for enhanced user interaction with a building automation system (BAS). In some embodiments, the present disclosure includes a conversational user interface that can respond to user inputs in a natural and conversational way (e.g., how a human would respond if provided with the same question or statement). In some embodiments, this can include determining a conversational context and/or conversational parameters corresponding to a series of user inputs. The conversational context and/or conversational parameters can include data such as user ID, location of the user, appropriate equipment, and/or desired actions, among other things. As one non-limiting example, a user may ask "why is it so hot in here?" The system can provide a response such as "conference room 12 has a current temperature setpoint of 80 degrees." The user can then reply "I want it to be cooler, can you lower the temperature?" The system can retain the user's location (e.g., conference room 12) from the first input, and therefore understand that the user would like the temperature to be lowered for that specific location. Accordingly, users can have a conversation with the system, without having to reiterate key details. This can provide a natural dialogue between the user and the system. In some embodiments, this can enhance efficiency while monitoring and controlling systems within the BAS.

In some embodiments, the system can provide customized responses to different users. For example, if a building is operating within an energy efficiency program, there can be limits placed on who can change temperature setpoints. For example, if the building owner requests a cooler temperature, the system can comply. Conversely, if a general office employee requests a cooler temperature, the system can simply reply to the user without lowering the temperature setpoint. Further, the system can provide customized responses based on user skill level/expertise. As one example, if a general office employee asks "why is it so hot in here?" they can receive a reply of "there is a detected HVAC fault corresponding to your location, and a maintenance request has been submitted." Conversely, if an HVAC technician asks "why is it so hot in here?" they can receive a more technical response, such as "AHU 3 appears to have a faulty pressure sensor, try replacing it." Further aspects of the present disclosure are described in detail below.

Building HVAC Systems and Building Automation Systems

Figure 2:
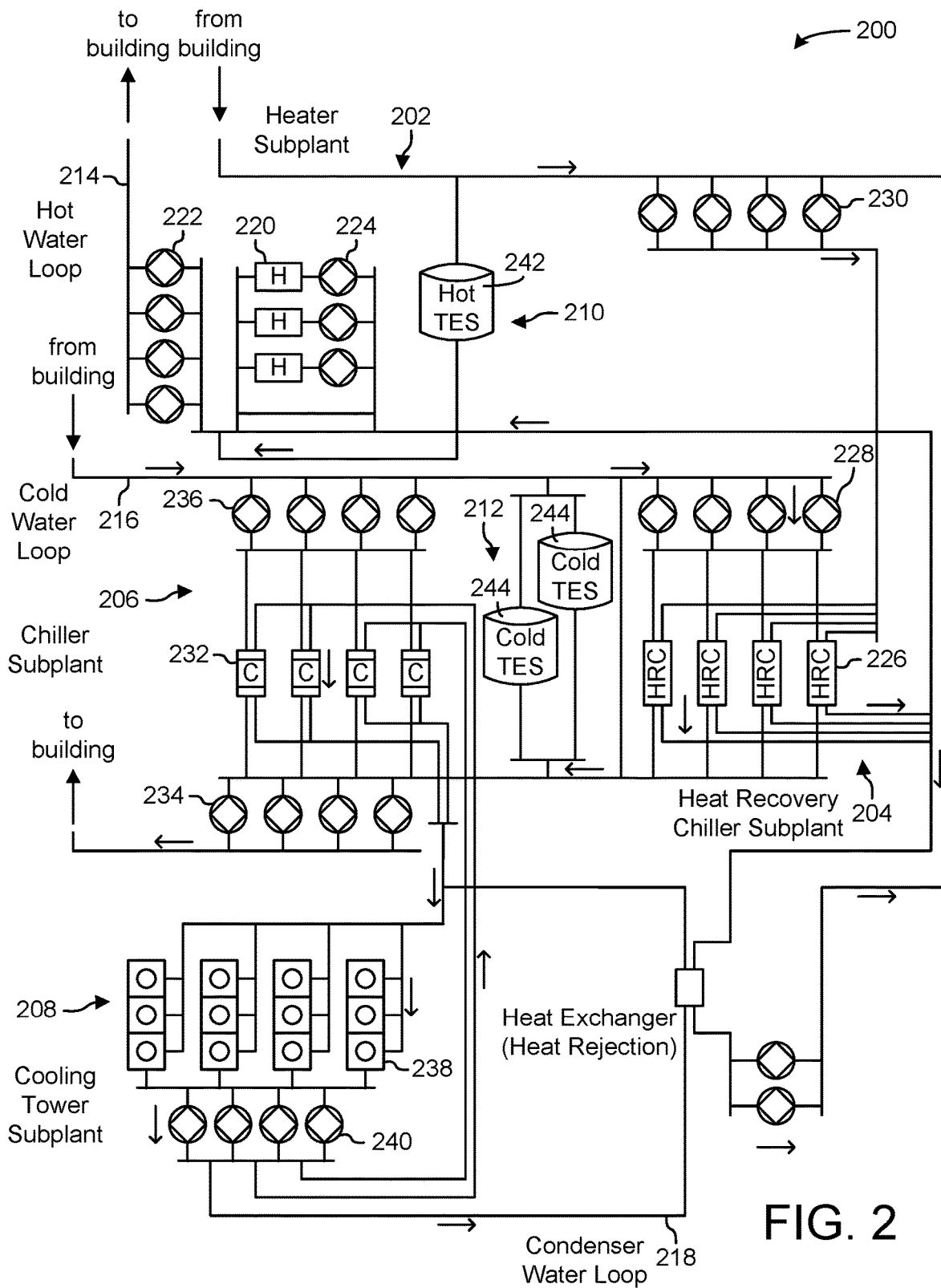
FIG. 2 is a block diagram of a waterside system which can be used to serve the building of FIG. 1, according to some embodiments.
Figure 3:
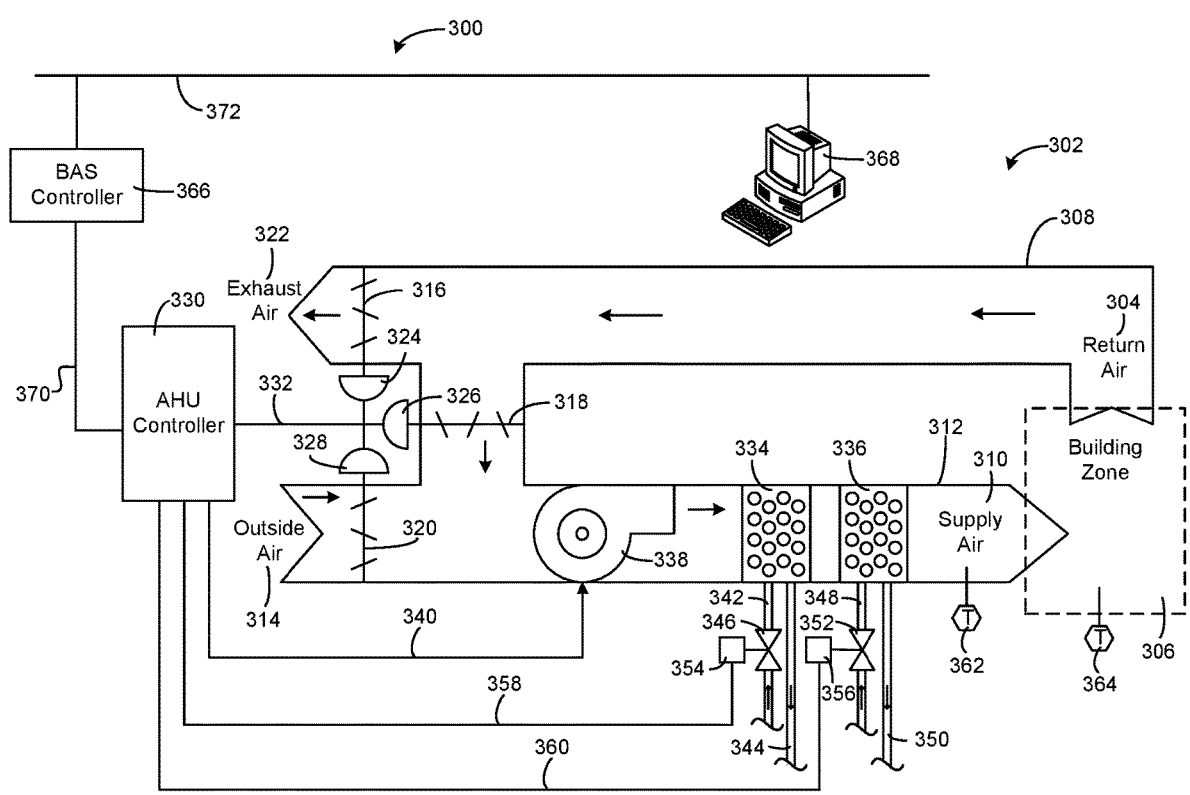
FIG. 3 is a block diagram of an airside system which can be used to serve the building of FIG. 1, according to some embodiments.
Figure 4:
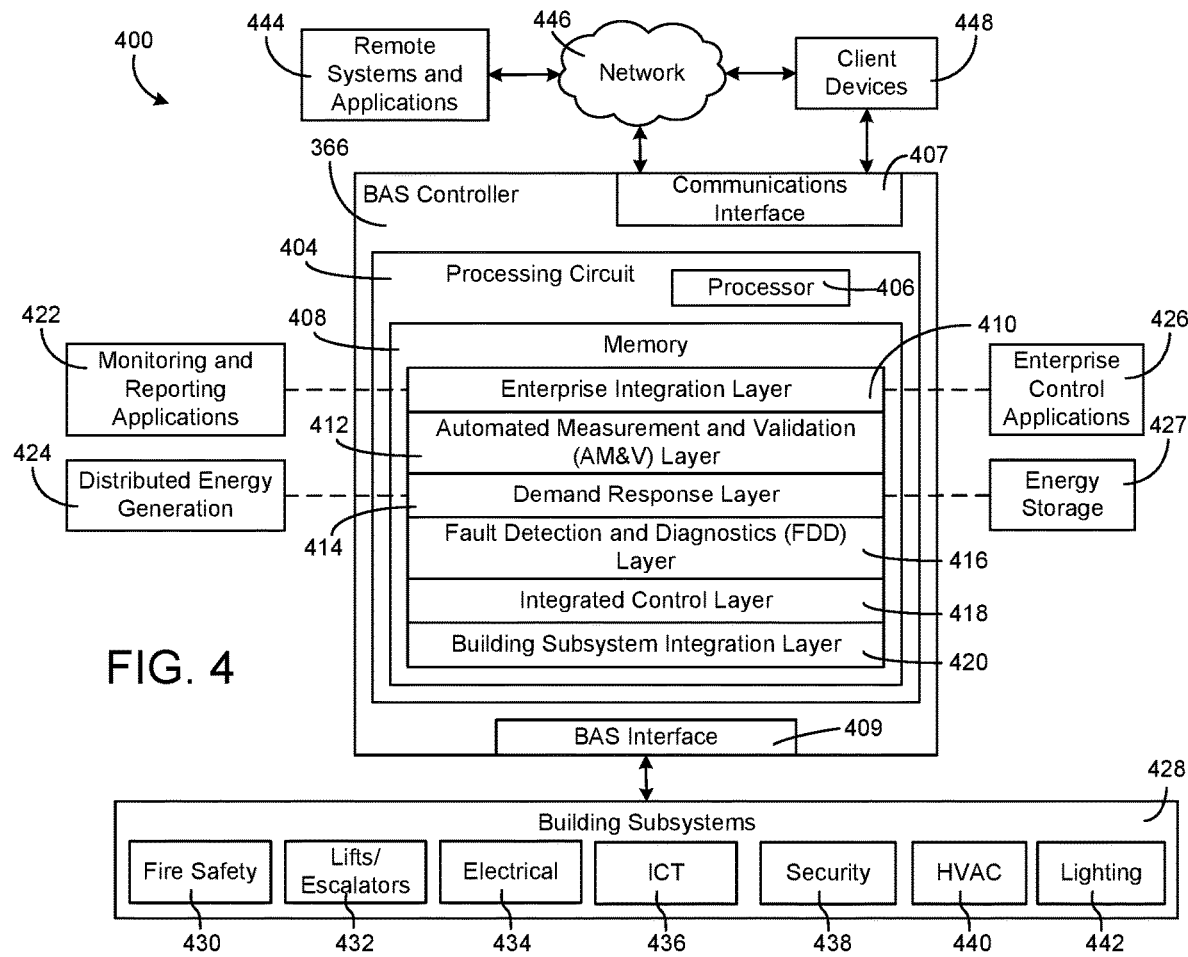
FIG. 4 is a block diagram of a building automation system (BAS) which can be used to monitor and control the building of FIG. 1, according to some embodiments.

Referring now to FIGS. 1-4, several building automation systems (BAS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BAS which can be used to monitor and control building 10.

Building and HVAC System

Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes a HVAC system 100. HVAC system 100 can include a number of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 1=-30 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a number of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a number of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a number of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a number of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a number of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and can correlate with the amount of energy consumed to achieve a desired supply air temperature. AHU 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Building Automation Systems

Referring now to FIG. 4, a block diagram of a building automation system (BAS) 400 is shown, according to some embodiments. BAS 400 can be implemented in building 10 to automatically monitor and control various building functions. BAS 400 is shown to include BAS controller 366 and a number of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a number of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a number of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

User Interaction With A Building Automation System (BAS)

As described above, the present disclosure includes systems, methods, and devices that can enhance user interaction with a building automation system (BAS). FIGS. 5-11D show various embodiments of the present disclosure.

Figure 5:
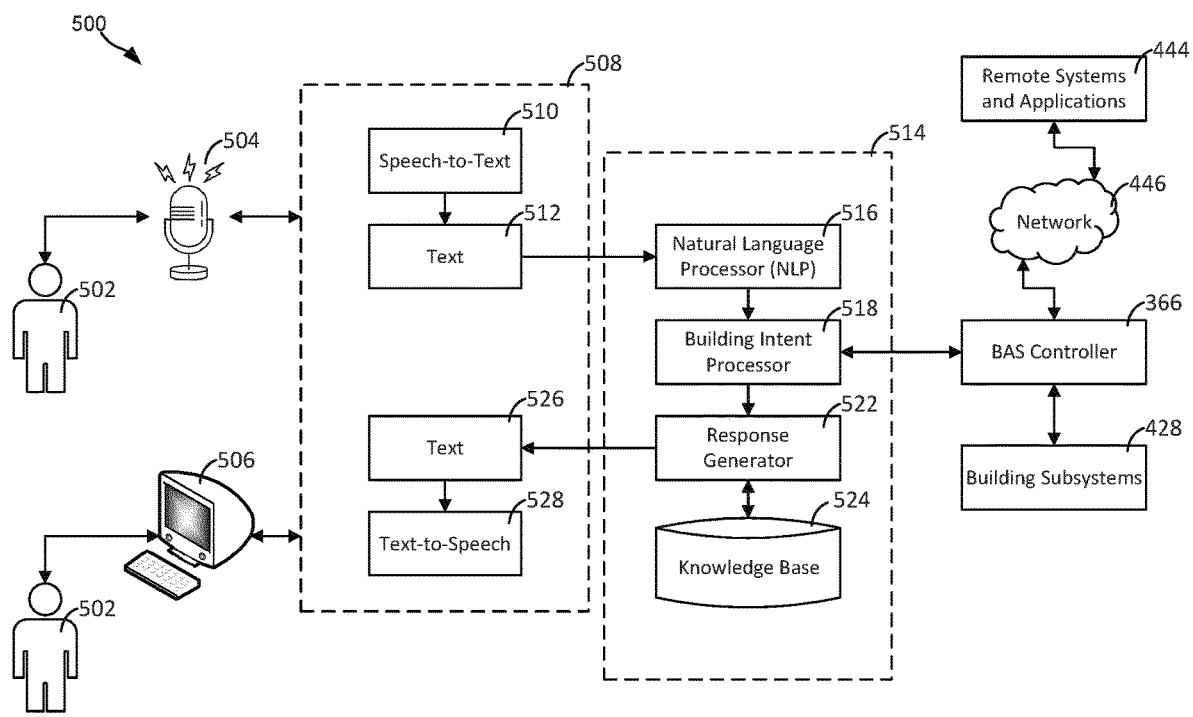
FIG. 5 is a block diagram of a communication network which can facilitate user interaction with the BAS of FIG. 4, according to some embodiments.
Figure 6:
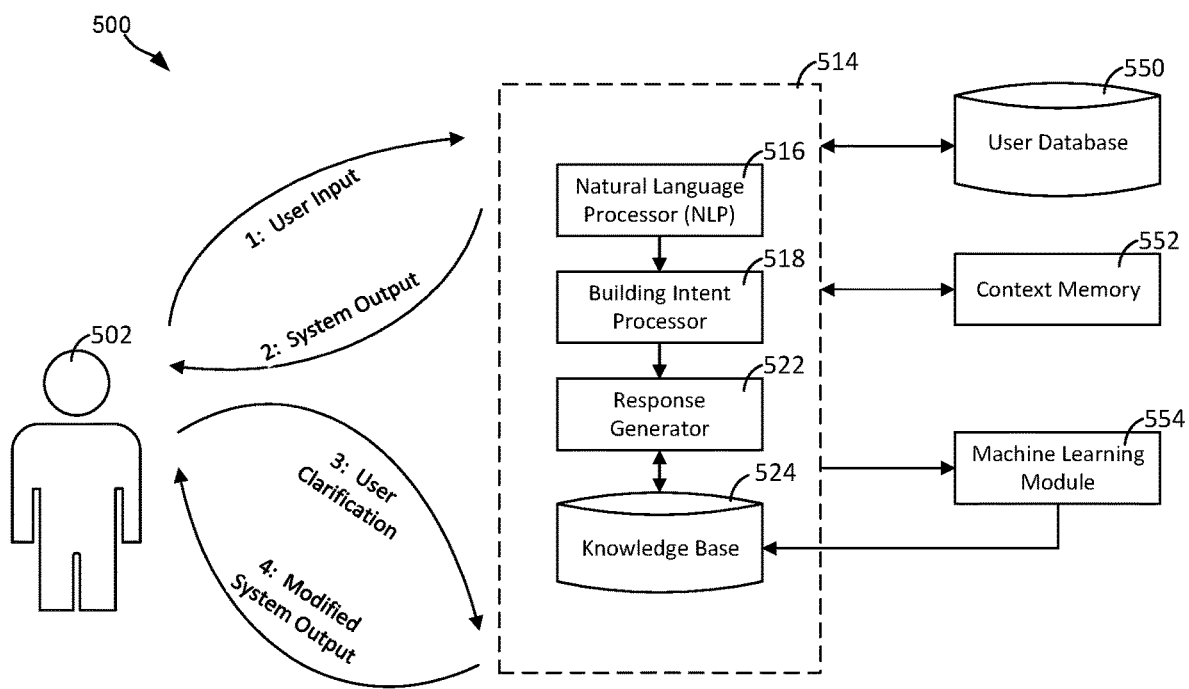
FIG. 6 is a block diagram of a user conversation via the communication network of FIG. 5, according to some embodiments.

Referring to FIGS. 5-6, a block diagram of a communication network 500 which can facilitate user interaction with the BAS of FIG. 4 is shown, according to some embodiments. As shown by FIG. 5, a user 502 can interact with communication network 500 in a variety of ways. Specifically, in some embodiments, user 502 can provide vocal inputs to user device 504. In some embodiments, user device 504 can include a speaker, and in some embodiments, a microphone. User device 504 can communicate the vocal inputs to translation system 508.

Similarly to user device 504, user 502 can provide system inputs via computer 506. In some embodiments, computer 506 can be configured to accept vocal inputs and/or textual inputs (e.g., via a keyboard, touchscreen). Computer 506 can communicate the vocal and/or textual inputs to translation system 508. In some embodiments, user inputs (e.g., vocal inputs, textual inputs) can correspond to a user question and/or a user command. In either instance, communication network 500 can facilitate a conversation between user 502 and BAS 400 (via BAS controller 366, as shown).

Translation system 508 can be configured to convert user inputs and/or outputs from server 514 to predetermined data formats. As shown, a vocal input from user device 504 and/or computer 506 can be converted to formatted text 512 via a speech-to-text converter 510. Similarly, in some embodiments, translation system 508 can convert formatted text 526 from server 514 to an audio output via text-to-speech converter 528. Accordingly, translation system 508 can accept text and vocal user inputs and provide text and audio outputs to a user.

As shown, translation system 508 can provide formatted text to server 514. More specifically, formatted text can be provided to a natural language processor (NLP) 516. Server 514 can include NLP 516, building intent processor 518, response generator 522, and/or knowledge base 524. In some embodiments, server 514 can communicate with BAS controller 366.

Server 514 components can further include an ingestion pipeline, databases, and multiple APIs and services. These components can be either installed on a local machine (or a cluster of machines) on the customer site or they can be all (or partially) implemented in the cloud (e.g. via a cloud-based service). A networking layer between equipment and controllers can also include different networking topologies and protocols.

Natural language processor (NLP) 516 can be configured to interpret the user inputs. In some embodiments, this can include statistical methods, machine learning methods, or rules-based and algorithmic methods, among other methods. In some embodiments, NLP 516 can be configured to detect language, parse text, determine proper part-of-speech for various words, and/or identify semantic relationships. In some embodiments, NLP 516 can be configured to reformat the received text to a standardized format (e.g., intent and entity parameters). In some embodiments, NLP 516 can provide the reformatted text to building intent processor 518.

In some embodiments, building intent processor 518 can receive reformatted text from NLP 516. Specifically, in some embodiments, building intent processor 518 can receive intent parameters and entity parameters corresponding to the user's vocal and/or text input. An entity can be a real world object that can be identified by a name. In building automation systems the entities are usually names of buildings, floors, rooms, people, and equipment, among others. Entities can be extracted from the text to be used as the parameters for the user request or intent. Intent can be the request or purpose of the question. If the user asks a question like "What are the High Priority Alarms in Building 2", the entities are "High Priority", "Alarm" and "Building 2". The intent of the sentence can be for example AlarmLookUp.

In some embodiments, building intent processor 518 can be configured to communicate with BAS controller 366. Building intent processor 518 can interpret the received intent and entity parameters in view of BAS 400. Accordingly, building intent processor 518 can determined a desired output that corresponds to the user's input. BAS controller 366 can then work with building intent processor 518 to provide the desired output, as needed.

In some embodiments, the intent and entity parameters can be within a BRICK schema. In some embodiments, building 10 can be modeled in BRICK schema that defines the ontology for building automation. BRICK can be utilized to relate spaces, equipment, and points to one another. Accordingly, BRICK can be used to define relationships between intent and entity parameters.

As shown, BAS controller 366 can communicate with building intent processor 518. In some embodiments, building intent processor 518 can request data from BAS controller 366. In some embodiments, the requested data can correspond to operating data, fault data, alarm history, consumption data, among other things. BAS controller 366 can then communicate with building subsystems 428 to determine the requested data, as needed. For example, BAS controller 366 may determine that a chiller within building subsystems 428 is in a fault state. BAS controller 366 can then provide this data to building intent processor 518. Further, in some embodiments, BAS controller 366 can communicate with remote systems and application 444 via network 446. In some embodiments, remote systems and applications 444 can provide requested data such as manufacturer part numbers, service history, and alarm history, among other things. BAS controller 366 can then provide this data to building intent processor 518.

In some embodiments, building intent processor 518 can provide updated operational parameters, or other control outputs, to BAS controller 366. This can be based on the determined intent and entity parameters. BAS controller 366 can then provide the updated operational parameters and/or control outputs to building subsystems 428 and/or remote systems and applications 444. In some embodiments, operational parameters can include setpoints, on/off commands, changing access rights for users, running predetermined software tests, requesting maintenance, ordering replacement parts, among other things. BAS controller 366 can provide a response to building intent processor 518, based on the updated operational parameter and/or control output. For example, BAS controller 366 can indicate to building intent processor 518 that a setpoint was lowered.

As shown, building intent processor 518 can communicate with response generator 522. In some embodiments, response generator 522 can be configured to reformat the BAS data and/or BAS response to a natural language form (e.g., conversational format). In some embodiments, response generator 522 can communicate with knowledge base 524 to determine additional information. For example, knowledge base 524 can provide stored BAS data (e.g., data trends, historical data), as well as predetermined responses associated with predetermined user inputs. As one example, if a common user input relates to "I'm too cold," knowledge database 524 can store a predetermined response relating to "would you like me to raise the temperature?" In some embodiments, authorized users can provide predetermined responses (e.g., if there is a "green initiative," this can be explained to users via a predetermined response).

Response generator 522 can use the BAS data and data from knowledge base 524 to create a custom response for each user input. The response can accordingly vary by terminology used, length of response, indication of improper access rights, and dialect, among other things. Advantageously, response generator 522 can mirror speaking patterns of the specific user, which can provide a conversational dialogue between the user and the BAS. Further, the present disclosure enables a user to feel as though they are working with a human, as opposed to a limited-capability "robot."

Response generator 522 can communicate with translation system 508. More specifically, response generator 522 can communicate with text module 526. As shown, response generator 522 can provide a response to text module 526, which can then be converted to an audio output via text-to-speech converter 528. In some embodiments, the system can output text to the user (e.g., via a user interface corresponding to computer 506). In this situation, translation system 508 may not alter the response provided from response generator 522.

Accordingly, a user 502 can request information and/or request a change to a building subsystem 428, and communication network 500 can be configured to facilitate data acquisition and/or the update of an operational parameter, all while conversationally engaging user 502.

Referring now to FIG. 6, a block diagram of a user conversation via the communication network 500 is shown, according to some embodiments. As an example, user 502 can provide a first user input (step 1), and receive a first system output (e.g., an audio output/response) (step 2). Next, user 502 can provide a second user input (e.g., a clarification) step 3), and receive a second system output (e.g., a modified system output) (step 4). In some embodiments, for example, user 502 can ask a question and receive a reply that does not sufficiently answer the question. User 502 can then provide clarification and/or rephrase the question and receive a modified reply that sufficiently answers the initial question. The interaction between user 502 and communication network 500 can accordingly be conversational and can flow naturally between inputs and outputs. As will be described, outputs can be customized based on a variety of factors, and server 514 can be updated based on previous user interactions.

As shown by FIG. 6, communications network 500 can, in some embodiments, include a user database 550, a context memory 552, and/or a machine learning module 554. User database 550, context memory 552, and/or machine learning module 554 can be in communication with server 514. In some embodiments, machine learning module 554 can be specifically in communication with knowledge base 524.

In some embodiments, user database 550 can store data corresponding to known users. For example, user database 550 can include user ID's, user access rights, and/or user position and corresponding user skill level. In some embodiments, user database 550 can further include voice recognition data that can be used to identify user 502 directly from a vocal input. In some embodiments, user 502 may be logged in to a network device corresponding to BAS 400. By logging in, server 514 can request the corresponding user information from user database 550.

In some embodiments, response generator 522 can use data (e.g., user ID's, user access rights, and/or user position and corresponding user skill level) from user database 550 to further customize a response/output. High level management, for example, can be permitted to control operational parameters within BAS 400, whereas a temporary contractor may only be permitted to request information corresponding to BAS 400 (as opposed to changing a BAS operation).

In some embodiments, server 514 can, for example, verify that a current user has appropriate access rights prior to acting on the user's input. Additionally, user 502 can request (e.g., via a vocal or textual input) to have a new user added to BAS 400. Accordingly, user database 550 can be updated to include the new user and any associated access rights. Additional examples relating to customized outputs are described below with respect to FIGS. 8-9.

In some embodiments, context memory 552 can be configured to store a conversation context (e.g., conversation parameters) for subsequent user inputs. The conversation context can be determined from a first user input, and can include data such as location, associated equipment, applicable subsystems, and desired output, among other things. The conversation context can be used to determine responses/outputs for any subsequent user inputs. Advantageously, user 502 does not have to repeat the same terms and phrases for each subsequent input. For example, user 502 can ask a series of questions regarding a fault on AHU 8. Context memory 552 can retain that user 502 is likely still referring to AHU 8, even though each subsequent input does not state "AHU 8." Accordingly, responses can be intuitively linked to each conversation context. As shown by FIG. 6, at step 3, user 502 does not need to restate all of the information provided in step 1, as the conversation context can be stored in context memory 552.

In some embodiments, context memory 552 can be reset at predetermined intervals of time. Alternatively, context memory 552 can be reset if a user input has not been detected for a threshold amount of time. In some embodiments, context memory 552 can be reset manually. Alternatively, context memory 552 can be reset if a new user is detected (e.g., via a change in login information, via voice recognition, etc.). In some embodiments, server 514 can compare current intent and entity parameters to the prior intent and entity parameters, and determine if differences exist. Context memory 552 can then be reset if a threshold variance is detected between the current and prior intent and entity parameters.

In some embodiments, machine learning module 554 can be configured to update knowledge base 524 based on new user inputs and corresponding outputs. For example, as shown by FIG. 6, the first system output (step 2) did not sufficiently answer the first user input (step 1), but the modified system output (step 4) did sufficiently answer the first user input (step 1). User 502 had to provide a clarifying input (step 3) to receive the modified system output. Accordingly, machine learning module 554 can be configured to update knowledge base 524 such that the modified system output is better associated with the first user input. Therefore, subsequent inputs similar to the first user input can receive a sufficient response without user 502 having to provide clarification. Advantageously, server 514 can adapt over time, and increase the accuracy of responses as it is being used. In some embodiments, machine learning module 554 can be further configured to learn user preferences and dialect (and accordingly update responses to known users).

Figure 7:
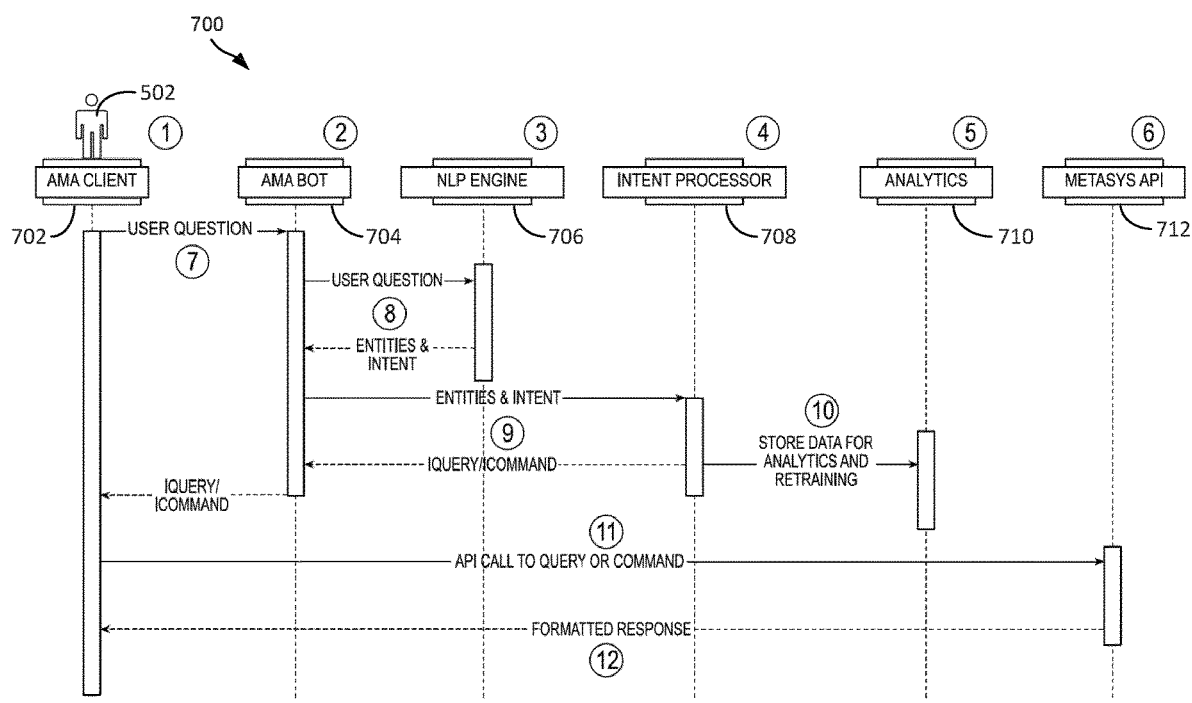
FIG. 7 is a flowchart of a process for user interaction with the BAS of FIG. 4, according to some embodiments.

Referring now to FIG. 7, a flowchart of a process 700 for user interaction with a BAS (e.g., BAS 400) is shown, according to some embodiments. As shown, user 502 can interact with AMA client 702. In some embodiments, AMA client 702 may be the same or similar to user device 504 or computer 506. AMA client 702 can communicate with AMA bot 704. In some embodiments, AMA bot 704 may be the same or similar to translation system 508. AMA bot 704 can communicate with an NLP engine 706 and an intent processor 708. In some embodiments, NLP engine 706 may be the same or similar to NLP 516, and/or intent processor 708 may be the same or similar to building intent processor 518. Intent processor 708 can communicate with analytics module 710. In some embodiments, analytics module 710 may be the same or similar to machine leaning module 554. AMA client 702 can further communicate with a BAS API (shown as METASYS ® API 712). In some embodiments, BAS 400 can be a product of Johnson Controls, such as the META-SYS ® building automation system.

An example process 700 is shown by FIG. 7, according to some embodiments. As shown, user 502 can input a user question via AMA client 702 (step 7). AMA bot 704 can receive the user question and provide it to NLP engine 706, and NLP engine 706 can respond to AMA bot 704 with corresponding intent and entity parameters (step 8). AMA bot 704 can then provide the intent and entity parameters to intent processor 708 and receive a response corresponding to whether the user question relates to a query or a command (step 9). Intent processor 708 can provide analytics module 710 with data for analytics and retraining (step 10). AMA bot 704 can provide the query/command response to AMA client 702 (step 9). Next, AMA client 702 can provide an API call to query or command to METASYS® API 712 (step 11). METASYS® API 712 can provide a formatted response to AMA client 702 (step 12). In some embodiments, process 700 can include more or fewer steps.

In some embodiments, NLP engine 706 can be a machine learning model that is trained to extract entities and intent parameters from every sentence the user inputs. The model training can involve feeding a training algorithm with sample questions and the right labels that include the entities and intent parameters for that specific utterance. The machine learning algorithm can generalize the question based on the language models provided to the algorithm. For example, when training the system with "Show me the Alarms in Floor 1" based on the language models for English for example, asking similar questions can result similar intent extraction. Questions like "Show us the Alarms in Floor 1" or "Display the Alarms in Floor 1" can be automatically understood by the system. Through training, a model can be validated for the building automation system environment. Accordingly, NLP engine 706 can extract all BAS entities such as floor names, building names, date and time, name of cities, and more.

In some embodiments, analytics module 710 can be responsible for gathering all the user questions as well as the entities and intents extracted by NLP engine 706. Using this data and following questions from the user, the accuracy of the intent extraction is evaluated. If the score of the extraction engine is not high enough, or if the user has to ask follow-up questions, then the data is marked to be used in retraining the model. The marked data can be stored in a database and checked with the user. The user can provide additional labels before retraining the model. The user can choose from the top intents identified by the engine to make sure that the training will fix any misclassifications in the next training session. The labeled data is then used to retrain the model so the next time the user asks the same question NLP engine 706 will be able to recognize the right intent. This learning capability allows NLP engine 706 to improve over time.

In some embodiments, IQuery and ICommand correspond to the actions that need to be taken in order to process intent and entities extracted from the user input. They can be a query or function call with the appropriate parameters that are associated with the entities. For example for an AlarmLookUp intent, an IQuery can be generated, for example: AMA.API.AlarmLookUp("High Priority", "Building 2").

Figure 8:
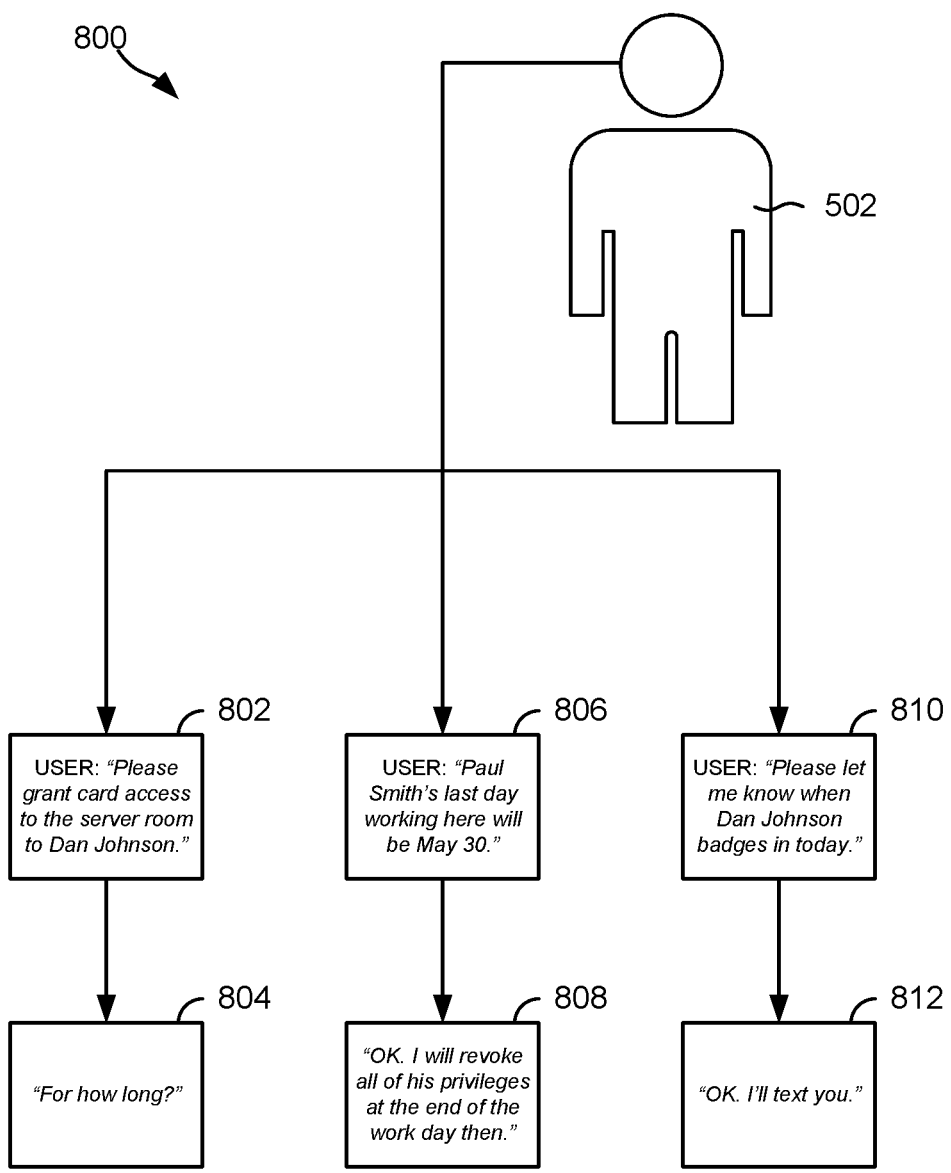
FIG. 8 is a flowchart of example interactions of a user with the BAS of FIG. 4, according to some embodiments.
Figure 9:
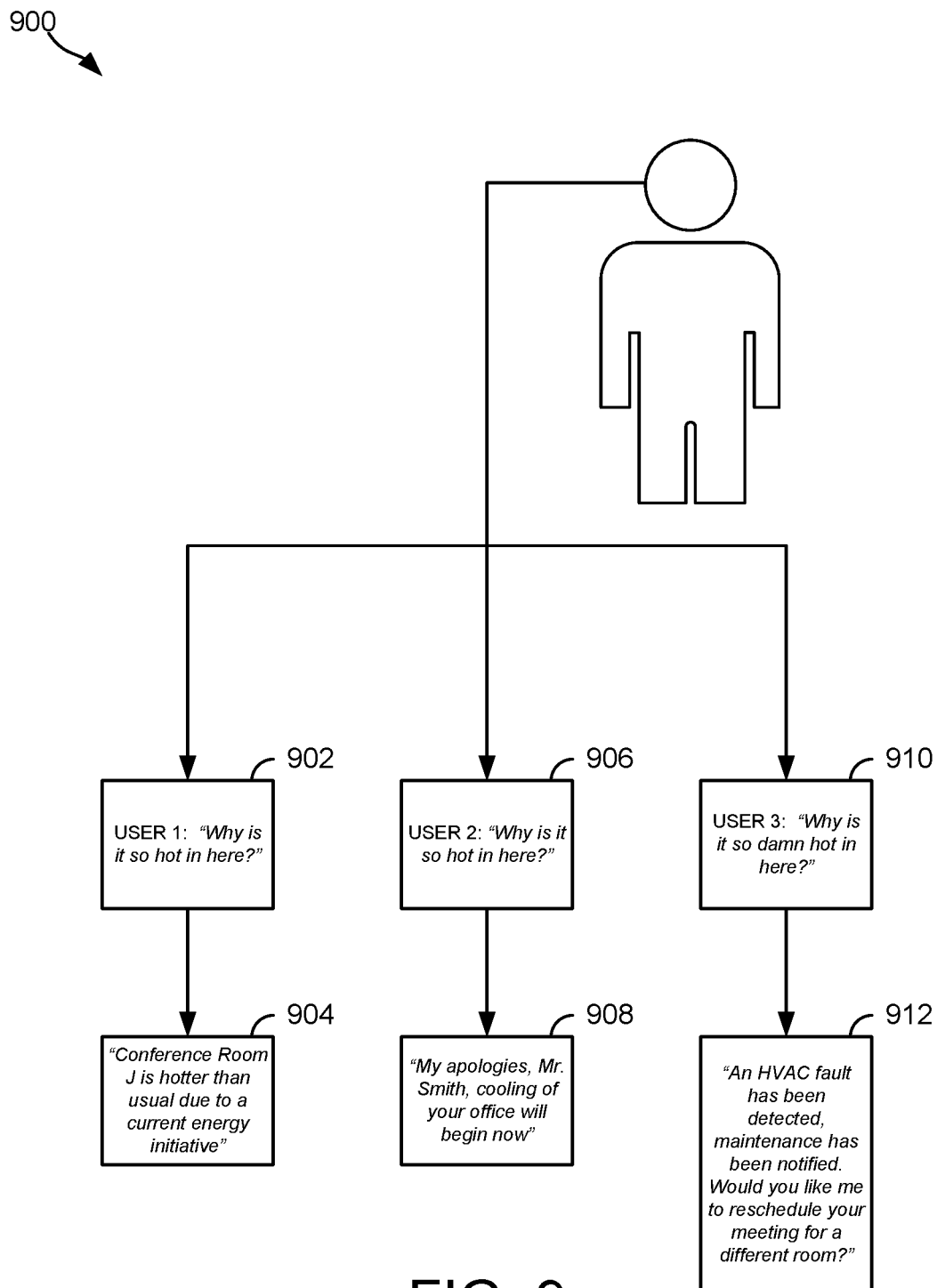
FIG. 9 is another flowchart of example interactions of a user with the BAS of FIG. 4, according to some embodiments.

Referring now to FIGS. 8 and 9, example interactions of a user with BAS 400 are shown. FIG. 8 is a process 800 for user 502 interacting with BAS 400, according to some embodiments. As shown, user 502 states "please grant card access to the server room to Dan Johnson" (step 802). According to the systems and methods described herein, the user device (e.g., user device 504, computer 506) can reply back to the user "for how long?" (step 804). User 502 can then provide additional details via the user device.

Still referring to FIG. 8, user 502 is shown to state "Paul Smith's last day working here will be May 30" (step 806). According to the systems and methods described herein, the user device can reply back to user 502 "OK. I will revoke all of his privileges at the end of the work day then" (step 808). In some embodiments, on May $30^{th}$, server 514 can remove Paul Smith from user database 550 and revoke his access rights.

Still referring to FIG. 8, user 502 is shown to state "please let me know when Dan Johnson badges in today" (step 810). According to the systems and methods described herein, the user device can reply back to user 502 "OK. I'll text you" (step 812). In some embodiments, server 514 can communicate with BAS controller 366 to determine when Dan Johnson badges in (e.g., by monitoring building subsystems 428). Further, server 514 can communicate with user database 550 to retrieve contact information corresponding to user 502 (e.g., a cell phone number). When Dan Johnson badges in, server 514 can be configured to generate (e.g., via response generator 522) a text message and send it to user 502's cell phone.

Referring to FIG. 9, additional example interactions between a user and BAS 400 are shown, according to some embodiments. FIG. 9 highlights the custom response aspects of the present disclosure. As shown, user 1 states "why is it so hot in here?" (step 902). According to the systems and methods described herein, the user device can reply back to user 1 "conference room J is hotter than usual due to a current energy initiative" (step 904). In some embodiments, server 514 can communicate with BAS controller 366 and determine that an energy initiative is currently active within the building.

Still referring to FIG. 9, user 2 is shown to state "why is it so hot in here?" (step 906). According to the systems and methods described herein, the user device can reply back to user 2 "my apologies, Mr. Smith, cooling of your office will begin now" (step 908). In some embodiments, server 514 can communicate with BAS controller 366 to change a temperature setpoint for a specific room (e.g., Mr. Smith's office). Further, server 514 can identify user 2 as being Mr. Smith via voice recognition, location information, and/or login information.

Still referring to FIG. 9, user 3 is shown to state "why is it so damn hot in here?" (step 910). According to the systems and methods described herein, the user device can reply back to user 3 "an HVAC fault has been detected, maintenance has been notified. Would you like me to reschedule your meeting for a different room?" (step 912). As described above, server 514 can be configured to request maintenance based on a detected fault. Further, server 514 can be configured to determine locations affected by the fault and compare them to a user's location. Accordingly, server 514 can determine that user 3 is in a room that has been affected by an HVAC fault, and can communicate with BAS controller to reserve an alternative location for user 3. Notably, user 3 included profanity in their input to the user device. In some embodiments, the present disclosure includes a "swearable" user interface. In some embodiments, server 514 can be configured to interpret profane language and customize the response accordingly (e.g., if a customer is irate, server 514 can detect this and customize the response to appease the customer).

Notably, users 1, 2, and 3 all provided similar inputs (steps 902, 906, 910). However, each received a different response. As previously described, server 514 can determine a user ID, user access rights, and/or user position and corresponding user skill level using user database 550. In the present example, server 514 has identified that user 1 does not have access rights to change a temperature setpoint, and the responds accordingly. Server 514 has identified that user 2 is Mr. Smith, who owns the company and has full access rights; server 514 responds accordingly to Mr. Smith. Further, server 514 has identified that user 3 is angry, and provides a response that includes a potential solution.

Figure 10:
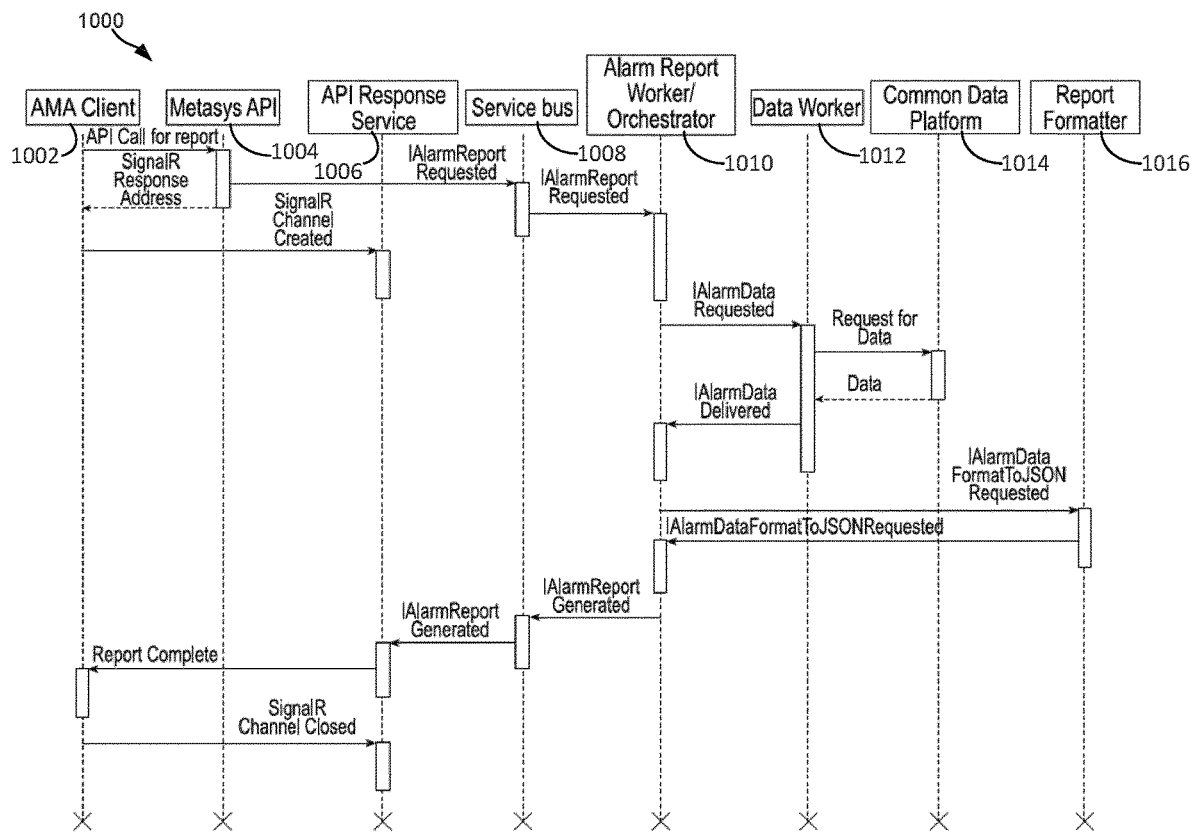
FIG. 10 is a flowchart of an example process for user interaction with the BAS of FIG. 4, according to some embodiments.

Referring now to FIG. 10, a flowchart of an example process 1000 for user interaction with BAS 400 is shown, according to some embodiments. As shown, AMA client 1002, METASYS® API 1004, API response service 1006, service bus 1008, alarm report worker/orchestrator 1010, data worker 1012, common data platform 1014, and report formatter 1016 are in communication with one another. Process 1000 provides an example user request for an alarm report and the corresponding communications to output the requested alarm report.

METASYS® API 1004 can be the API that the client will issue an API call to after the intent of the question has been processed and the client wants to get some data or issue a command. METASYS® API 1004 can return a SignalR channel address that can be used to show the user the percent completion info, timeouts, cancellation and error events to the client. This can provide the user the ability to cancel the request in the middle and see the updates if the volume of the data requested is high.

API response service 1006 can be responsible for preparing the response to be shown to the user. In some embodiments, the response can be sent to another device. The response service can push the data to the channel that was requested by the user. A useful example for this embodiment can be when the user uses a cellphone to issue a command or query and wants the data to be displayed on a computer that he is also logged into. The response service can take care of the appropriate response for that device.

Service bus 1008 can be the communication bus that the messages can be submitted to. Having service bus 1008 in the design can make it more scalable and modular so the other services can also pick up the message.

Alarm report worker/orchestrator 1010 can identify the data that needs to be returned and calls the data workers 1012 to retrieve the appropriate data. The data worker 1012 can pick up the message and call the APIs about alarms. The data worker 1012 may call multiple APIs to retrieve the information. All the APIs can be part of common data platform 1014 that can be used by other applications as well. The data can then be returned to alarm report worker/orchestrator 1010. Report formatter 1016 can be called to format the data. In the example shown by FIG. 10, JSON format is requested, so the data will be formatted as a JSON document.

Figure 11A:
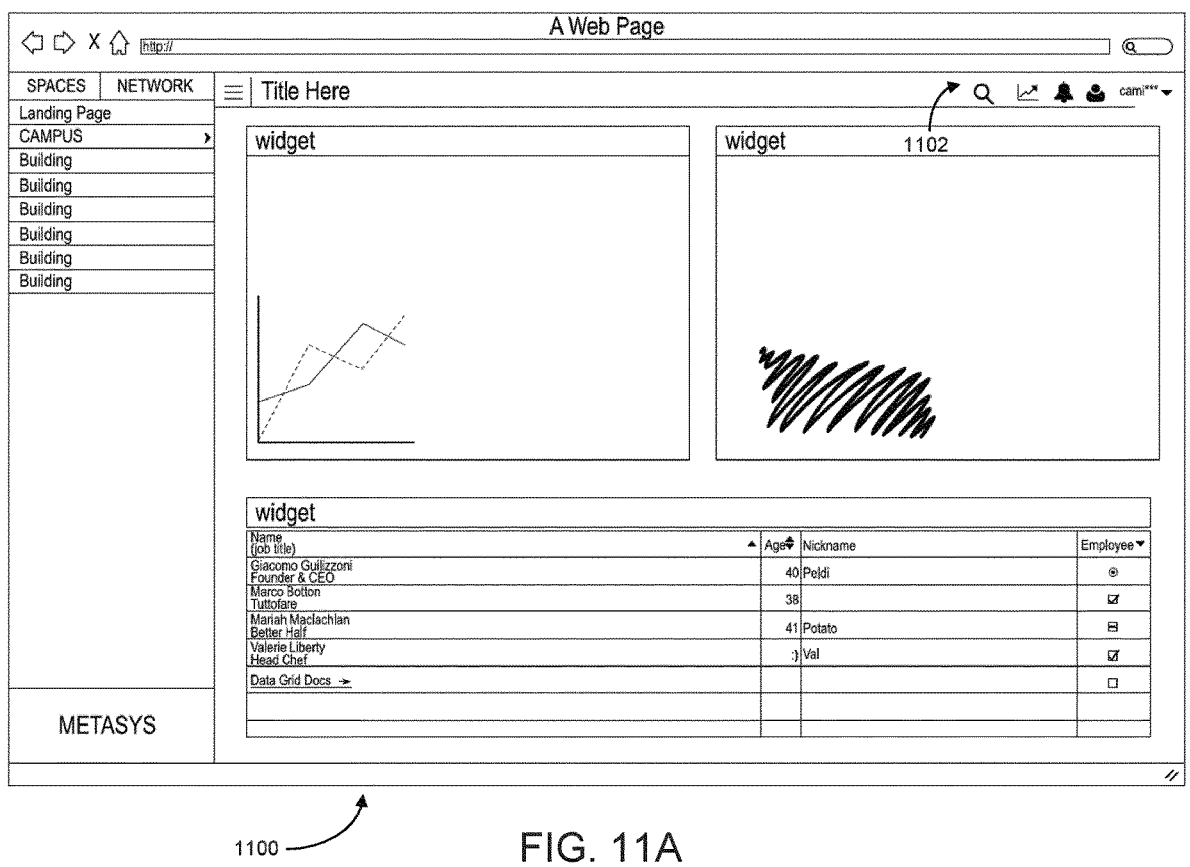
FIG. 11A is an example user interface corresponding to the BAS of FIG. 4, according to some embodiments.
Figure 11B:
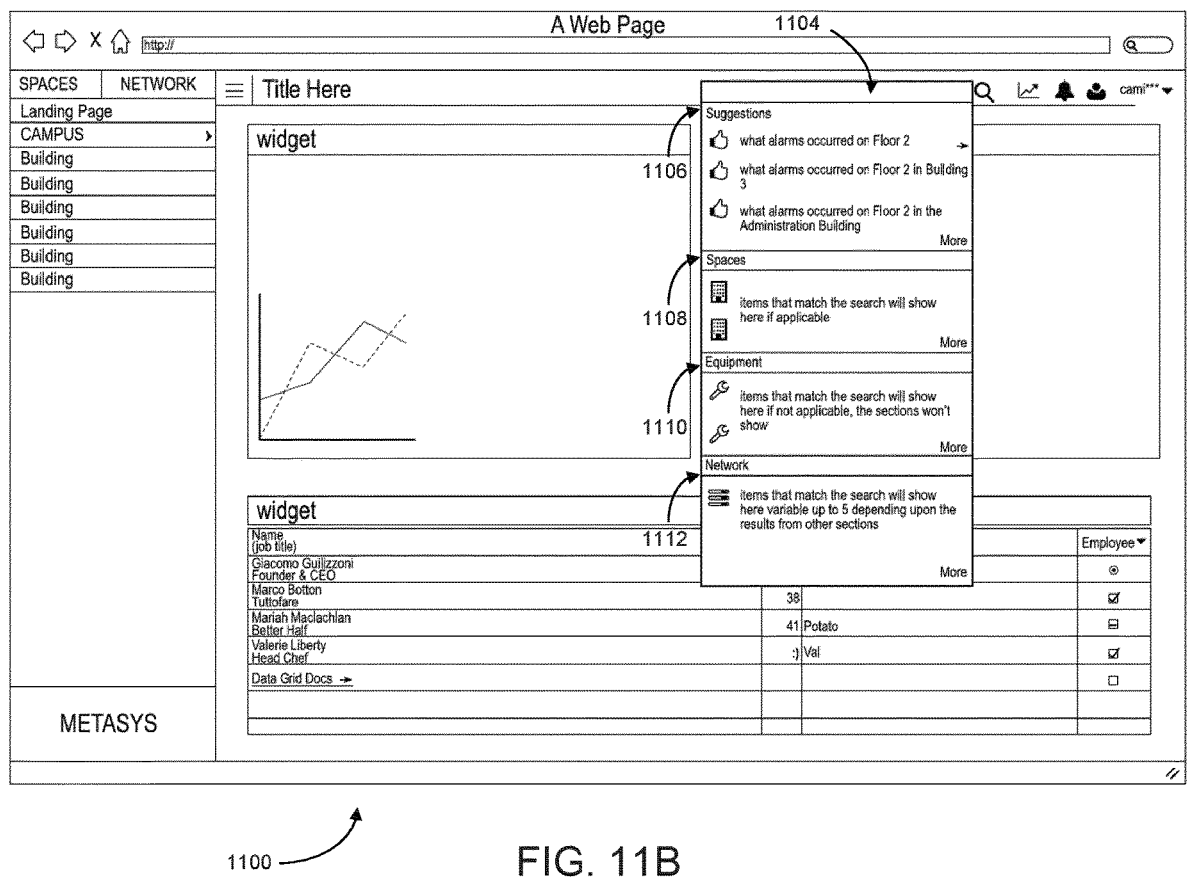
FIG. 11B is another view of the example user interface of FIG. 11A, according to some embodiments.

Referring now to FIGS. 11A-11D, an example user interface 1100 for interacting with BAS 400 is shown, according to some embodiments. As shown, user interface 1100 can be an existing BAS interface with additional features according to the present disclosure. Alternatively, a standalone user interface can be implemented, according to the present disclosure. FIG. 11A shows that, in some embodiments, user interface 1100 can include a search area 1102. Search area 1102 can be selectable, and a user can type questions into a corresponding search bar 1104 (see FIG. 11B) that appears upon selection. As shown by FIG. 11B user interface 1100 can display a dropdown menu from search bar 1104. In some embodiments, the dropdown menu can include various suggestions to the user, based on what search terms have already been entered. Alternatively, if no search terms have been entered, the dropdown menu can include suggestions based on popular features.

Still referring to FIG. 11B, user interface 1100 can include several fields for suggestions. For example, box 1106 can provide completion suggestions based on what the user has started to type in search bar 1104. Box 1108 can provide spaces (e.g., rooms, floors, buildings) that correspond to a user's search. Box 1110 can provide equipment (e.g., chiller, air-handling unit) that corresponds to a user's search. Further, box 1112 can provide network items (e.g., client device) that corresponds to a user's search. In some embodiments, if a search does not apply to all of the boxes (e.g., boxes 1108-1112), then only the applicable boxes can appear. Notably, search bar 1104 can accept any phrase written in natural language. Search bar 1104 can be configured to provide both suggestions and auto-completions for partial search phrases.

Figure 11C:
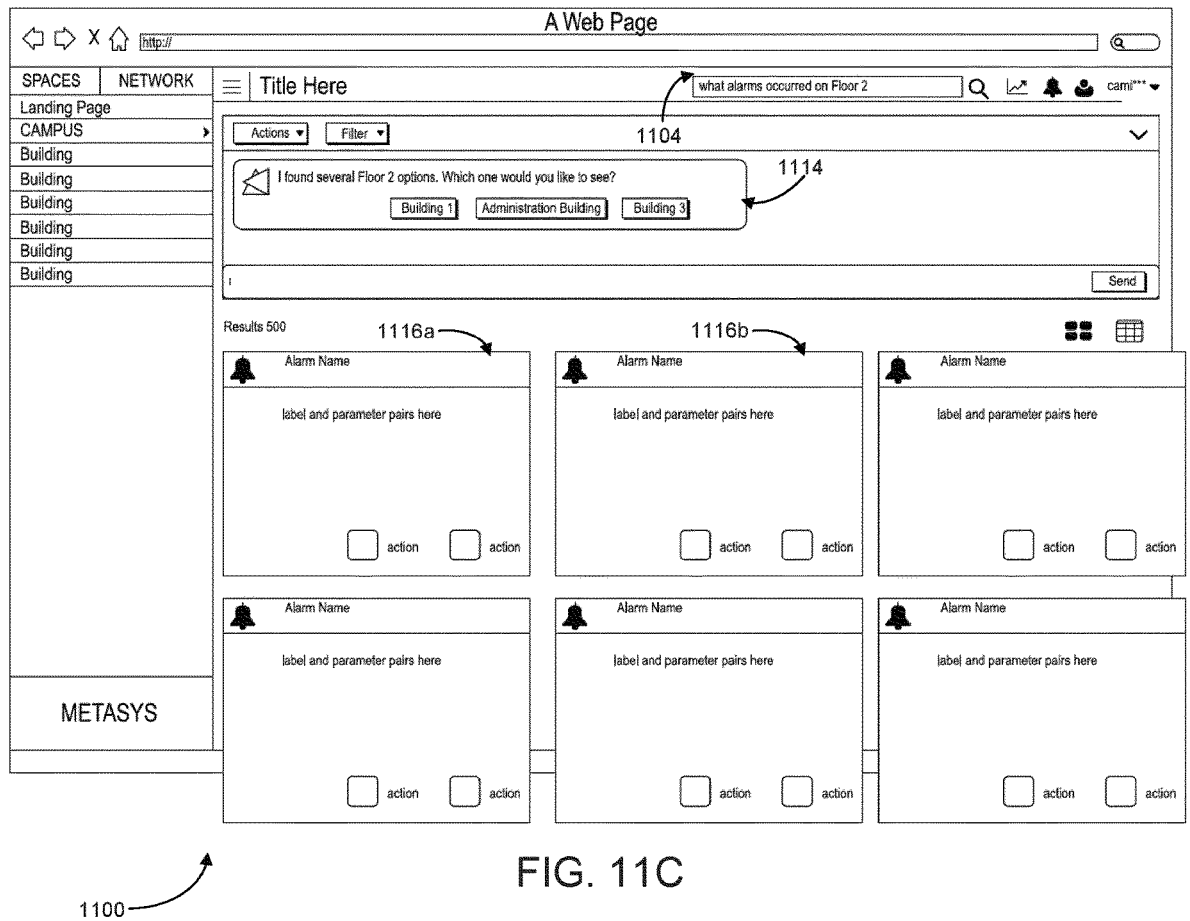
FIG. 11C is another view of the example user interface of FIG. 11A, according to some embodiments.

Referring now to FIG. 11C, an example search is shown, according to some embodiments. A user has typed "what alarms occurred on Floor 2" in search bar 1104. The server (e.g., server 514) can recognize that "Floor 2" is not a unique name within the known entities. Accordingly, user interface 1100 can display a clarifying question to the user (i.e., "I found several Floor 2 options. Which one would you like to see?"), as well as several selectable options. The clarifying question can be displayed in a chat box 1114, according to some embodiments. In some embodiments, the user can interact via microphone with a user device, and the responses can be provided via a speaker. In addition to chat box 1114 providing a clarifying question, user interface 1100 can be configured to display a plurality of corresponding results 1116a, 1116b. The user can choose to select from the plurality of results instead of responding to the clarifying question, if desired.

Figure 11D:
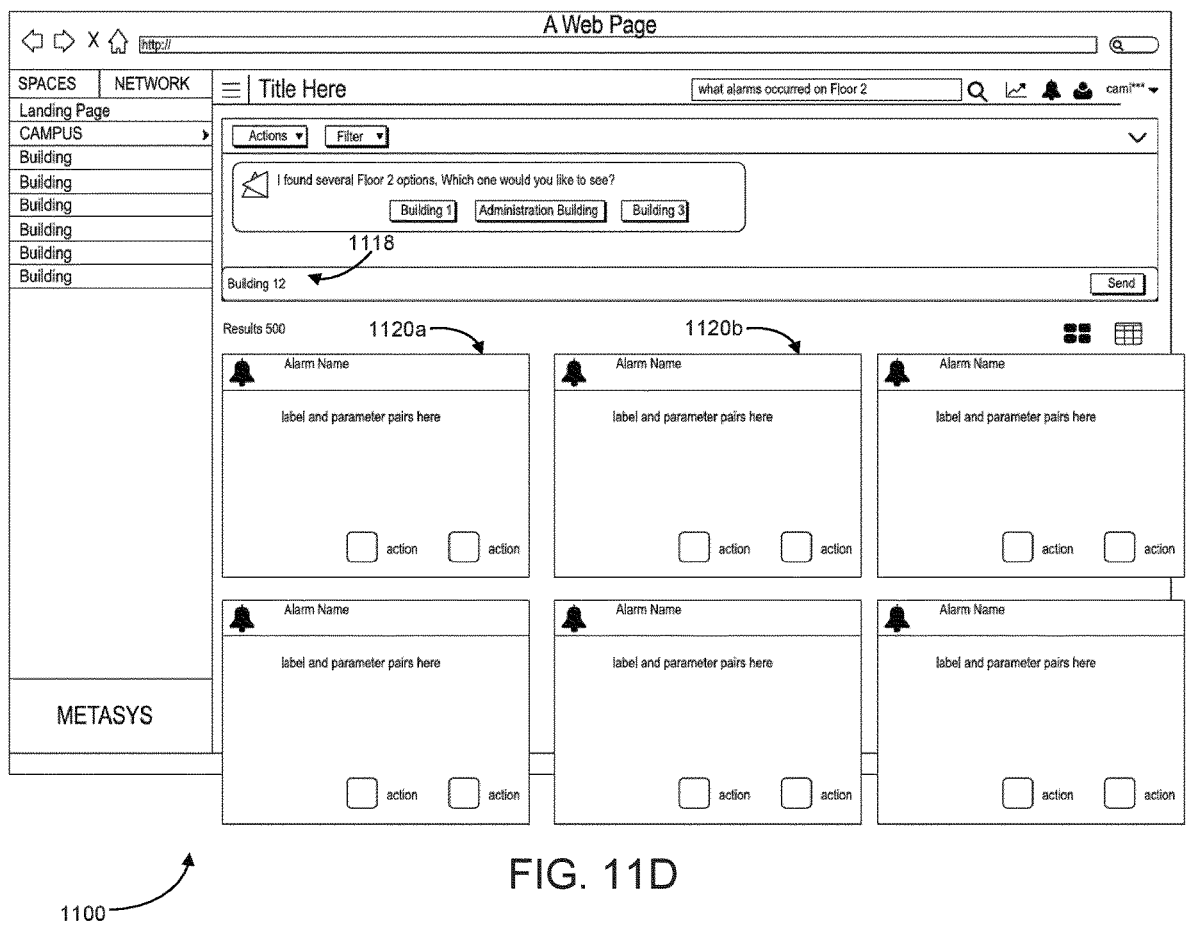
FIG. 11D is another view of the example user interface of FIG. 11A, according to some embodiments.

Referring now to FIG. 11D, user interface 1100 is shown to include a user response 1118. As shown, the user has provided a response "building 12," using chat bar 1118. In some embodiments, a user can select "send," and the plurality of corresponding results can be updated based on the provided response (e.g., now results 1120a, 1120b are displayed).

In some embodiments, the present disclosure provides systems and methods for diagnosing and fixing problems within building subsystems 428, via a conversational interaction between a user and a BAS. In some embodiments, a user device can alert a user to a detected problem, by initiating a conversation with the user. In some embodiments, server 514 can analyze potential fault causes to determine a corresponding probability for each cause. Further, server 514 can reprioritize (e.g., reorder) a list of potential fault causes based on the calculated probabilities. For example, the fault cause with the highest probability may be listed first, which can greatly increase efficiency when users attempt to troubleshoot the fault. In some embodiments, probability calculations can include past data trends, historical fault causes, associated faults (e.g., localized faults), etc.

In some embodiments, the present disclosure provides systems and methods for anticipating energy consumption, and providing recommendations to a user in advance of heightened energy consumption. For example, server 514 can be in contact with local weather resources, and may determine that a period of extremely hot weather is approaching. Server 514 can provide recommendations to a user directed at keeping energy costs low while considering occupant comfort, in advance of the hot weather period.

In some embodiments, the present disclosure provides a standalone user device configured to facilitate a conversation between a user and a BAS (e.g., BAS 400). In some embodiments, the user device can include an occupancy sensor (e.g., a proximity sensor, a thermal camera, an IR sensor, etc.), a speaker, a microphone, and a network-connected processor. In some embodiments, the processor is configured to communicate with BAS controller 366. In some embodiments, the user device does not include an occupancy sensor. A user may then initiate a conversation with the user device via the microphone.

The occupancy sensor can be configured to detect the presence of a user, and in some embodiments, determine an approximate location of the user with respect to the sensor. In some embodiments, when a user is detected by the occupancy sensor, the user device may initiate a conversation with the user (via the speaker).

In some embodiments, the user device can include additional functionality. As one example, each fixed fire alarm and/or fire sensor can be configured to engage conversationally with a user, according to the systems and methods described herein. As another example, each fixed thermostat can be configured to engage conversationally with a user, according to the systems and methods described herein. In some embodiments, the user device can be a smartphone or other smart device (e.g., a smart watch, other smart wearables).

In some embodiments, server 514 can be configured to store software tests corresponding to BAS controller 366. Accordingly, a user can initiate BAS testing via a vocal or textual input.

In some embodiments, server 514 can be configured to assist a user during installation of a BAS. For example, server 514 can store start-up functions specific to installation procedures. A user can request, for example, associating an IP address with a newly installed network device.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps can differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for user interaction with a building automation system (BAS), the system comprising:
   a user device configured to accept vocal inputs and produce audio outputs; and
   a server in communication with the user device and a BAS controller, the server configured to:
   query the BAS controller using one or more application programming interfaces (API) of the BAS controller with an element associated with input text based on vocal input, the query configured to cause the BAS controller to return an operational parameter stored by the BAS controller;
   receive, from the BAS controller, BAS data including the operational parameter associated with a BAS device or a user corresponding to desired output, wherein the BAS data corresponds to a detected equipment fault;
   generate at least one audio output related to the operational parameter from the BAS data, wherein the at least one audio output alerts a user of the detected equipment fault; and
   submit a maintenance request based on the detected equipment fault.

2. The system of claim 1, further comprising updating a BAS parameter based on a desired output associated with the input text.

3. The system of claim 2, wherein the vocal input corresponds to a request to add a new user, and updating the BAS parameter comprises adding the new user to a BAS database and providing corresponding access rights.

4. The system of claim 1, wherein the maintenance request comprises at least an equipment name, a location, and fault data.

5. The system of claim 1, wherein the maintenance request comprises an order and payment for a replacement part.

6. The system of claim 1, wherein the BAS data corresponds to a detected equipment fault, the server further configured to:
   determine a plurality of potential fault causes;
   calculate a probability for each potential fault cause; and
   determine the potential fault with a highest probability;
   wherein the at least one audio output corresponds to the potential fault with the highest probability.

7. A method of user interaction with a building automation system (BAS), the method comprising:
   query a BAS controller using one or more application programming interfaces (API) of the BAS controller with an element associated with first user input, the query configured to cause the BAS controller to return an operational parameter stored by the BAS controller;
   receiving BAS data from the BAS controller, the BAS data including the operational parameter associated with a BAS device or a user corresponding to the first user input;
   providing, to a user, a first output corresponding to the operational parameter from the BAS data by displaying the first output via a user interface;
   displaying a list of selectable options corresponding to the first output
   determining a second user input by detecting a user selection corresponding to the second user input;
   reprioritizing the list of selectable options for subsequent inputs based on the user selection;
   forming a second output based on the second user input and a conversation context of the first user input; and
   providing, to the user, the second output by displaying the second output via the user interface.

8. The method of claim 7, further comprising:
   determining a user ID; and
   customizing each of the first output and the second output, based on the user ID.

9. The method of claim 8, further comprising:
   determining access rights corresponding to the user ID; and
   updating a BAS parameter based on at least one of the first user input and the second user input,
   wherein the access rights comprise updating the BAS parameter.

10. The method of claim 7, further comprising:
   accessing a BAS database to determine the BAS data;
   comparing the second output to the first output to determine a preferred output corresponding to the first user input; and
   updating the BAS database with the preferred output.

11. The method of claim 7, wherein the conversation context comprises intent and entity parameters corresponding to the first user input.

12. The method of claim 7, further comprising resetting the conversation context when a new user provides an input.

13. The method of claim 7, further comprising resetting the conversation context after a threshold amount of time without subsequent user inputs.

14. A user device for communicating with a building automation system (BAS), the user device comprising:
   a proximity sensor configured to determine a user location with respect to the user device;
   a microphone configured to accept vocal inputs from a user;
   a speaker configured to produce audio outputs to the user;
   a processor in communication with the proximity sensor, the microphone, and the speaker, and configured to:
      receive user location data from the proximity sensor;
      receive a vocal input from the microphone;
      store, in a memory, context parameters corresponding to the vocal input and the user location data;
      determine a desired output corresponding to the vocal input;
      query the BAS using one or more application programming interfaces (API) of the BAS with an element associated with the vocal input, the query configured to cause the BAS to return an operational parameter stored by the BAS;
      receive BAS data including the operational parameter associated with a BAS device or a user, wherein the BAS data corresponds to a detected equipment fault;
      update an operating parameter within the BAS based on the desired output; and
      provide an audio output to the speaker, the audio output related to the operational parameter associated with the detected equipment fault from the BAS data;
      submit a maintenance request based on the detected equipment fault;
   wherein the processor analyzes a subsequent vocal input using the context parameters, prior to providing a subsequent audio output.

15. The user device of claim 14, wherein the operating parameter corresponds to BAS equipment associated with the user location.

16. The user device of claim 14, wherein the processor is further configured to:
   determine a user ID from the vocal input;
   determine access rights corresponding to the user ID; and
   verify that the access rights comprise updating the operating parameter.

17. The user device of claim 14, wherein the vocal input corresponds to a request to add a new user, and updating the operating parameter comprises adding the new user to a BAS database and providing corresponding access rights.

* * * * *